United States Patent
Malladi

(10) Patent No.: US 8,576,806 B2
(45) Date of Patent: Nov. 5, 2013

(54) METHOD OF MULTIPLEXING UNICAST AND MULTICAST TRANSMISSIONS

(75) Inventor: Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1207 days.

(21) Appl. No.: 11/672,845

(22) Filed: Feb. 8, 2007

(65) Prior Publication Data

US 2007/0183353 A1 Aug. 9, 2007

Related U.S. Application Data

(60) Provisional application No. 60/771,735, filed on Feb. 8, 2006.

(51) Int. Cl.
*H04B 7/216* (2006.01)

(52) U.S. Cl.
USPC ............ 370/335; 370/312; 370/342; 455/453

(58) Field of Classification Search
USPC ......... 370/335–337, 312, 342, 345, 229–240, 370/328, 431, 341; 725/96; 379/112.04; 455/453
See application file for complete search history.

(56) References Cited

U.S. PATENT DOCUMENTS

| | | | | |
|---|---|---|---|---|
| 5,721,735 | A * | 2/1998 | Smiroldo | 370/442 |
| 6,115,390 | A * | 9/2000 | Chuah | 370/443 |
| 2002/0086691 | A1 * | 7/2002 | Kostic et al. | 455/503 |
| 2004/0092274 | A1 * | 5/2004 | Moon et al. | 455/500 |
| 2004/0198371 | A1 | 10/2004 | Balasubramanian et al. | |
| 2005/0026613 | A1 | 2/2005 | Moon et al. | |
| 2005/0094659 | A1 * | 5/2005 | Watson | 370/432 |
| 2007/0189289 | A1 * | 8/2007 | Frederiksen et al. | 370/390 |
| 2008/0130615 | A1 * | 6/2008 | Kashiwagi et al. | 370/343 |
| 2008/0304581 | A1 * | 12/2008 | Bykovnikov | 375/260 |

FOREIGN PATENT DOCUMENTS

| | | |
|---|---|---|
| EP | 14118710 | 5/2004 |
| EP | 1528832 | 5/2005 |
| JP | 2003060644 A | 2/2003 |
| JP | 2003274446 A | 9/2003 |
| JP | 2005065261 A | 3/2005 |
| JP | 2005514860 A | 5/2005 |
| WO | WO03058887 A1 | 7/2003 |

OTHER PUBLICATIONS

Panasonic, "Unicast/Multicast Multiplexing for Downlink OFDM", R1-060158, TSG-RAN WG1 LTE Ad hoc meeting, Helsinki, Finland, Jan. 23-25, 2006.*

LG Electronics, "Multiplexing of MBMS and Unicast Transmission in E-UTRA Downlink", R1-060054, 3GPP TSG-RAN WG1 LTE Ad hoc meeting, Helsinki, Finland, Jan. 23-25, 2006.*

(Continued)

*Primary Examiner* — George Eng
*Assistant Examiner* — Marcus Hammonds
(74) *Attorney, Agent, or Firm* — John J. Ketchum

(57) ABSTRACT

Systems and methodologies are described that facilitate multiplexing of unicast and multicast transmissions in a wireless communication system, such as OFDMA. According to various aspects, the system and methods are employed for selecting an appropriate multiplexing scheme in light of limitations such as system bandwidth and mobile terminal reception bandwidth capability, and uplink load of the wireless communication system.

26 Claims, 9 Drawing Sheets

(56) References Cited

OTHER PUBLICATIONS

International Preliminary Report on Patentability—PCT/US07/061829, The International Bureau of WIPO, Geneva Switzerland—Aug. 12, 2008.

International Search Report—PCT/US07/061829, International Search Authority—European Patent Office—May 31, 2007.

Written Opinion—PCT/US07/061829, International Search Authority—European Patent Office—May 31, 2007.

* cited by examiner

METHOD OF MULTIPLEXING UNICAST AND MULTICAST TRANSMISSIONS

CROSS-REFERENCE TO RELATED APPLICATION

This application claims the benefit of U.S. provisional application Ser. No. 60/771,735, filed on Feb. 8, 2006, and entitled METHOD OF MULTIPLEXING UNICAST AND MULTICAST TRANSMISSIONS. The entirety of this application is incorporating herein by reference.

BACKGROUND

I. Field

The following description relates generally to wireless communications, and more particularly to schemes for multiplexing unicast and multicast transmissions.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Wireless communication systems have become a prevalent means by which majority of people worldwide have come to communicate. Wireless communication devices have become smaller and more powerful in order to meet consumer needs, improve portability and convenience. The increase in processing power in mobile devices such as celluar telephones has lead to an increased in demands on wireless network transmission systems.

A typical wireless communication network (e.g., employing frequency, time, and code division techniques) include one or more base stations that provide a coverage area and one or more mobile (e.g., wireless) terminals that can transmit and receive data within the coverage area. A typical base station can concurrently transmit multiple data streams for broadcast, multicast, and/or unicast services, wherein a data stream is a stream of data that can be of independent reception interest a mobile terminal. A mobile terminal within the coverage area of that base station can be interested in receiving one, more than one or all the data streams carried by the composite stream. Likewise, a mobile terminal can transmit data to the base station or another mobile terminal.

In some instances when overall downlink transmission bandwidth in a wireless communications systems is limited by bandwidth reception capabilities of the one or more mobile systems within the communications system and increased data uplink load, overall transmission bandwidth can be negatively affected. A need in the art exists for effectively multiplexing unicast and multicast transmissions in light of system limitations.

SUMMARY

The following presents a simplified summary of one or more aspects in order to provide a basic understanding of such aspects. This summary is not an extensive overview of all comtemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method of performing multicast and unicast transmission in a wireless communication system, the method comprising: determining an uplink load of the system and selecting a multiplexing scheme based on one of the uplink load and radio-frequency (RF) reception capability of one or more mobile terminals.

In accordance with an aspect, as apparatus, comprising: a monitoring component that monitors uplink load in a wireless communications system; and a scheduling component that selects an appropriate unicast transmission and multicast transmission multiplexed transmission scheme based at least in part upon the uplink load.

In accordance with an aspect, a computer readable medium having stored thereon computer executable instructions for performing the following acts: determining an uplink load of a wireless communications system; and selecting a multiplexing scheme based on one of the uplink load and radio-frequency (RF) reception capability of one or more mobile terminals.

In accordance with another aspect, a processor having stored thereon computer executable instructions for performing the following acts: determining an uplink load of a wireless communications system; determining reception bandwidth capabilities of one or more mobile terminals; and selecting a multiplexing scheme based upon at least one of the uplink load and reception bandwidth capabilities of the one or more mobile terminals.

In accordance with an aspect, an apparatus, comprising: means for determining an uplink load of a wireless communications system; and means for selecting an appropriate unicast transmission and multicast transmission multiplexing scheme based at least in part on the uplink load and RF capabilities of one or more mobile systems within the wireless communications system.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Figure 1:
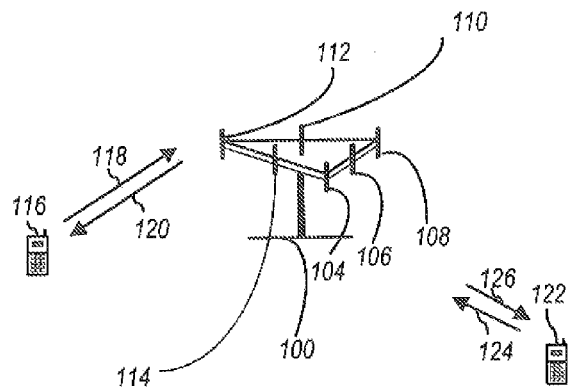
FIG. 1 is an illustration of a multiple access wireless communication system according to one embodiment.

Various embodiments are now described with reference to the drawings, wherein like reference numerals are used to refer to like elements throughout. In the following description, for purpose of explanation, numerous specific details are set forth in order to provide a thorough understanding of one or more embodiments. In may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone a wireless local loop (WLL) station, a personal digital assistant (PDA), a handheld device having wireless connection capability, computing device, or other processing device connected to a wireless modem. Moreover, various embodiments are described herein in connection with a base station. A baser station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc), smart cards, and flash memory devices (e.g., EPROM, card, stick, key drive, etc.). Additionally, various storage media described herein can represent one or more devices and/or other machine-readable media for storing information. The term "machine-readably medium" can include, without being limited to, wireless channels and various other media capable of storing, containing, and/or carrying instruction(s) and/or data.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 12 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 188, 120, 124, and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. A access terminal may also be called a access terminal, a user equipment (UE), a wireless communication device, terminal, access terminal or some other terminology.

Figure 2:
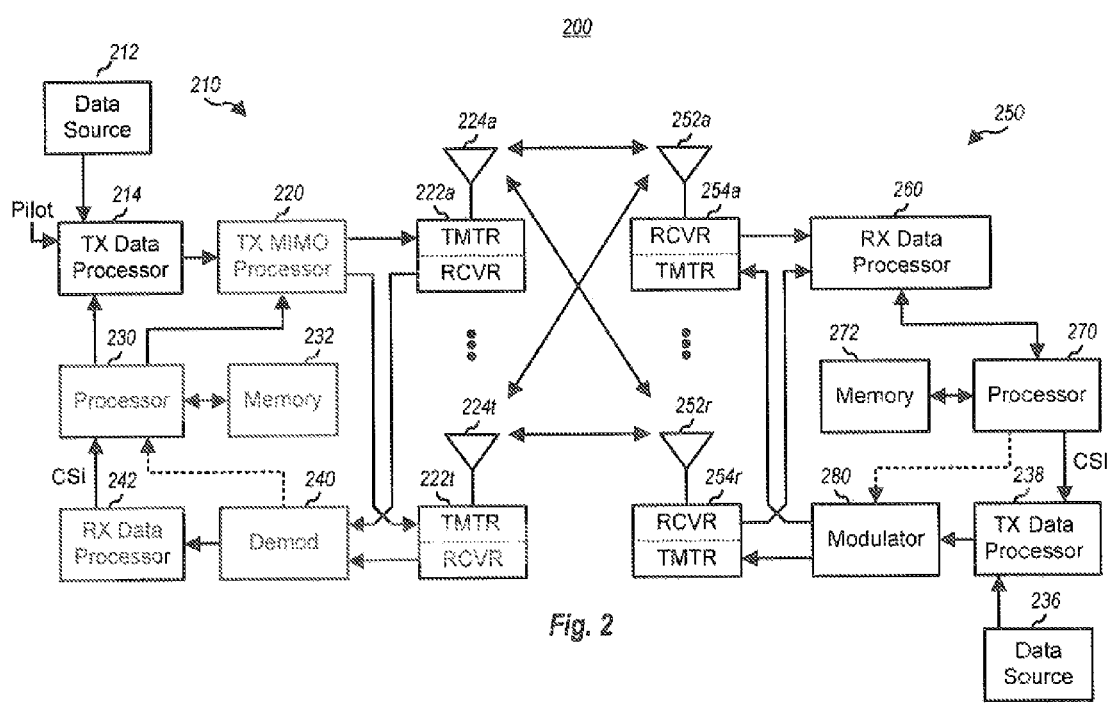
FIG. 2 is a block diagram of am example communication system.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 222t, respectively. At receiver system 250, the transmitted modulated signals are received by $N_R$ antennas 252a through 252r and then received signal from each antenna 252 is provided to a respective receiver (RCVR) 252a through 252r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 206 is complementary to that performed by TX MIMO processor 220 and TX data processor 214 at transmitter system 210. Processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
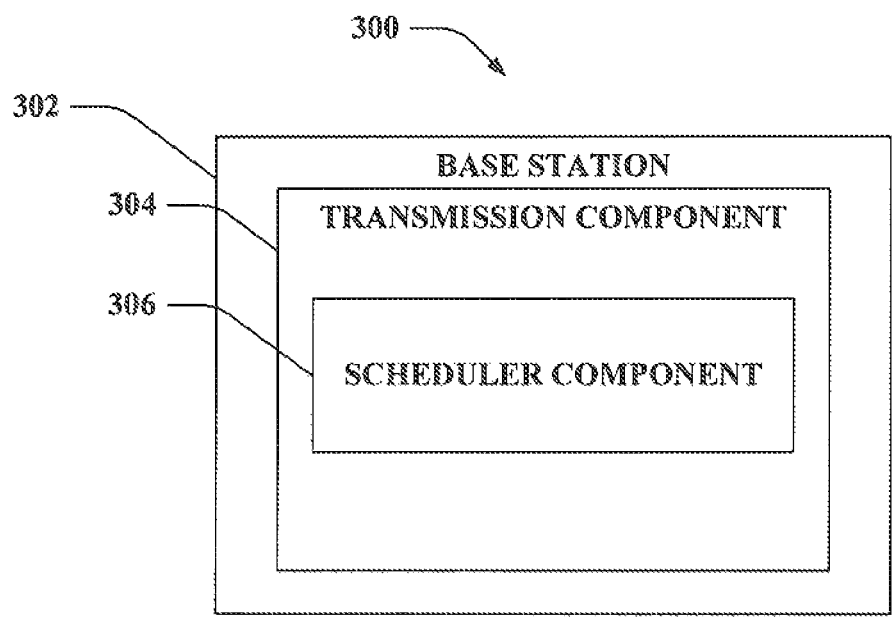
FIG. 3 is an illustration of an example system that effectuates selection of an optimal multiplexed unicast and multicast transmissions scheme.

Referring now to FIG. 3, a wireless communications system 300 (for example, CDMA, TDMA, FDMA, OFDM or OFDMA systems) is illustrated that effectuates selection of an optimal multiplexed unicast and multicast transmission scheme to be employed by a base station 302. Base station 302 comprises a transmission component 304 which facilitates scheduling of an appropriate transmission scheme in light of a plurality of data transmission factors, in particular uplink load (e.g. number of mobile terminals within a given wireless communication system that are requesting uplink data transmissions), downlink transmission bandwidth of a communication system, multicast transmission bandwidth, and mobile terminal bandwidth reception capabilities. In particular, for example, a large uplink load can occupy a large portion of overall bandwidth of the wireless communications system. Therefore, it is desirable to use available system bandwidth efficiently by varying the amount of bandwidth that is dedicated to respective multicast and unicast transmissions. Transmissions component 304 facilitates selection of an appropriate multiplexed unicast and multicast transmission scheme by employing a scheduling component 306. As an example, scheduling component 306 can facilitate selection of an appropriate multiplexed transmission scheme based at least in part upon the plurality of data transmission factors. It is to be appreciated that the scheduling component 306 may use different schemes during each frame of a transmission or may use the same scheme for multiple frames. The scheduler may use a time division multiplexing scheme, a frequency division multiplexing scheme or both.

Figure 4:
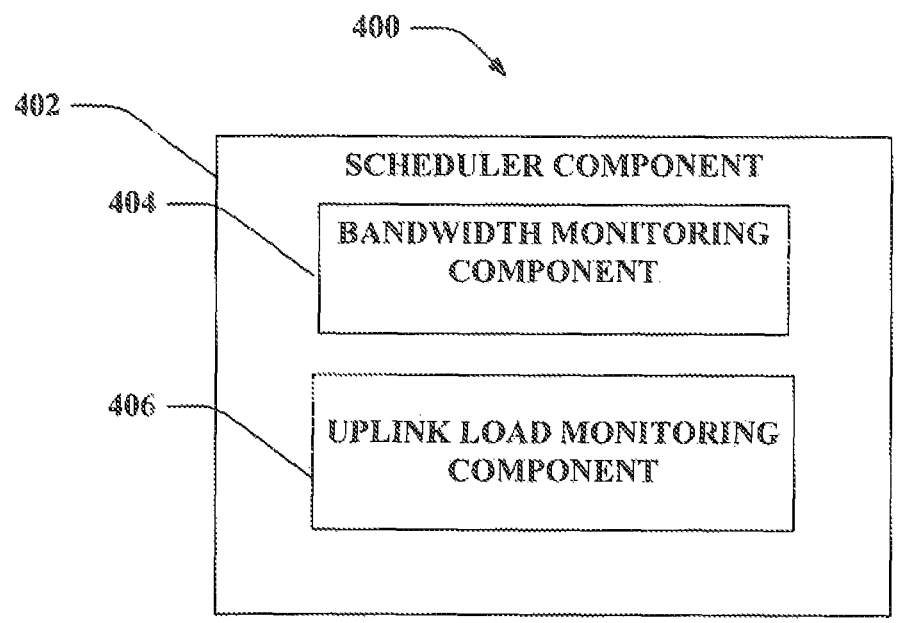
FIG. 4 is another illustration of an example system that effectuates selection of an optimal multiplexed unicast transmission scheme.

With reference now to FIG. 4, a wireless communications system 400 is illustrated that effectuates selection of an optimal multiplexed unicast and multicast transmission scheme. Scheduling component 402 can facilitate selection of an appropriate transmission scheme via employment of bandwidth monitoring component 404 uplink load monitoring component 406. Bandwidth monitoring component 404 compares bandwidth capabilities of the communications system 400 with bandwidth capabilities of the mobile terminal that is associated with scheduling component 402. Moreover, uplink load monitoring component 406 monitors how many mobile terminals within communications system 400 are requesting uplink data transmissions. Uplink load monitoring component 406 further determines whether the uplink load exceeds a pre-determined threshold value by comparing the uplink load value to the pre-determined threshold value. Scheduling component 402 subsequently employs a suitable unicast and multicast multiplexed transmission scheme in light of the results returned from bandwidth monitoring component 404 and uplink load monitoring component 406. More particularly, as an example, scheduling component 402 can determine that a certain portion of the reception bandwidth capabilities of a mobile terminal should be dedicated to multicast transmission based on the values returned by bandwidth monitoring component 404 and uplink load monitoring component 406.

Figure 5A:
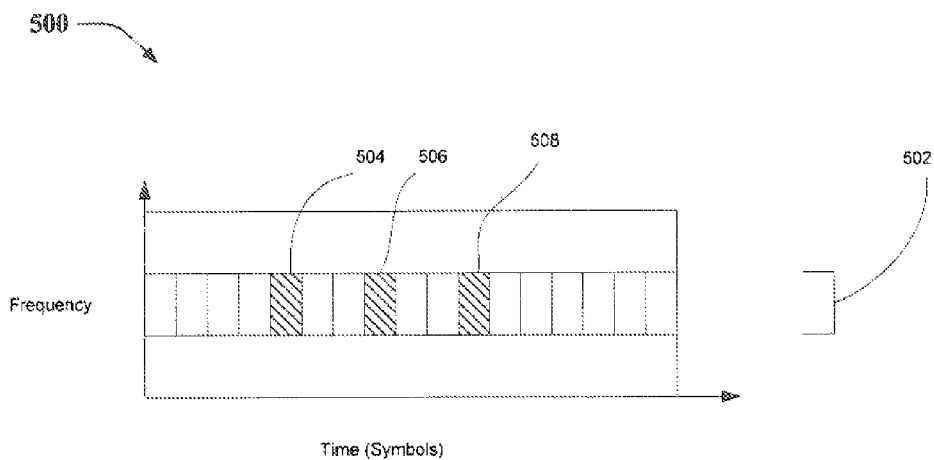
FIG. 5A is an illustration of an example scheme that effectuates a multiplexed unicast and multicast transmissions scheme.

With reference now to FIG. 5a, a first scheme 500 is shown that provides multicast transmission according to an aspect. A scheduler component (not shown) associated with a base station can employ the scheme 500 where downlink transmission bandwidth of the wireless communications system and the reception bandwidth capabilities of the mobile terminal are the same (for example 5 Mhz as shown at 502), and an uplink load (e.g. number of mobile terminals that are requesting uplink data transmissions) is below a predetermined threshold. In this embodiment, the scheduler components may dedicate one or more portions 504, 506, or 508 within the dedicated bandwidth 502 for multicast transmission.

Figure 5B:
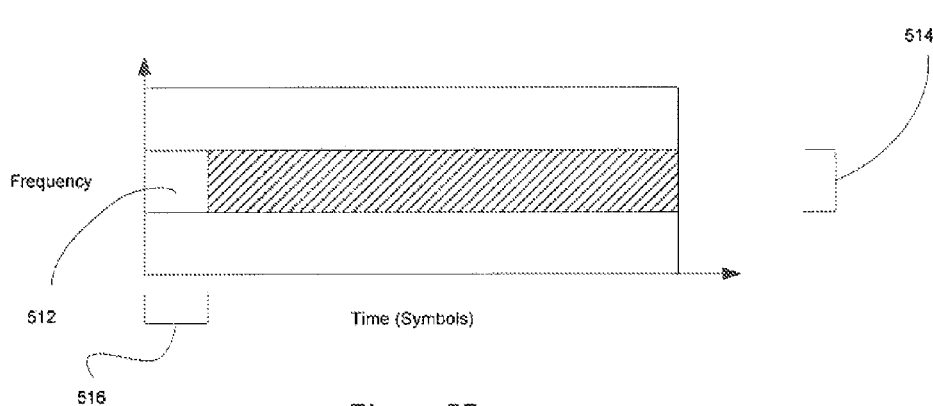
FIG. 5B is another illustration of an example scheme that effectuates a multiplexed unicast and multicast transmission scheme.

With reference to FIG. 5b, a second scheme 510 is shown that provides multicast transmission according to another aspect. In particular, when downlink transmission bandwidth of the communication system and reception bandwidth capabilities of the mobile terminal are equivalent but the uplink load is heavy and/or above the predetermined threshold, the scheduler component (not shown) may use second scheme 510 as shown in FIG. 5B. In this embodiment, the scheduler component may use a first portion 512 of the dedicated bandwidth 514 for a predetermined duration (one or more symbols of an associated frame) to provide uplink assignments and acknowledgement/negative acknowledgement (ACK/NAK) of successful transmissions. Thereafter, the scheduler component can use the remaining duration of the frame to perform multicast transmission using the full system bandwidth (e.g. 5 hz).

Figure 5C:
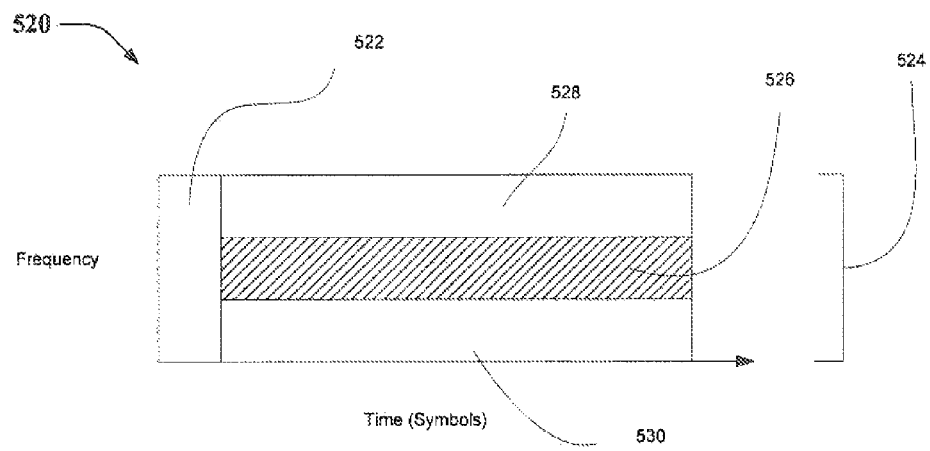
FIG. 5C is another illustration of an example scheme that effectuates a multiplexed unicast and multicast transmission scheme.

With reference now to FIG. 5c, a third scheme 520 is shown for performing multicast transmission according to another aspect. Scheme 520 can be employed by a scheduler component (not shown) associated with the base terminal (not shown) to perform multicast transmission. Scheme 520 can be employed, for example, where the downlink transmission bandwidth of the communications system (e.g. 15 Mhz) is greater than the reception bandwidth capabilities of one or more mobile terminals (some mobile terminals may have 5 Mhz and others may have 10 Mhz) and the multicast bandwidth (for exaple 5 hz). Where the uplink load is below a predetermined threshold, the scheduler component may use a time-division multiple (TDM) access concept and dedicate one more symbols of an associated frame for multicast transmission. However, when the uplink load is above a predetermined threshold, the scheduler component will use a first portion 522 of the system bandwidth 524 to provide uplink assignments and ACK/NAK transmission. The duration of the first portion 522 may be for one or more symbols of a frame. For the remaining symbols of the frame, the scheduler component will use the frequency portion 526 allocated to all mobile terminals having the lowest reception bandwidth capabilities (e.g. 5 Mhz) to perform multicast transmissions. The mobile terminals having a higher bandwidth (e.g. 10 Mhz) will use the small portion 526 as would the mobile terminals having a smaller reception bandwidth. However, the mobile terminals having a higher bandwidth may use other portions 528 or 530 to perform unicast transmissions.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 6:
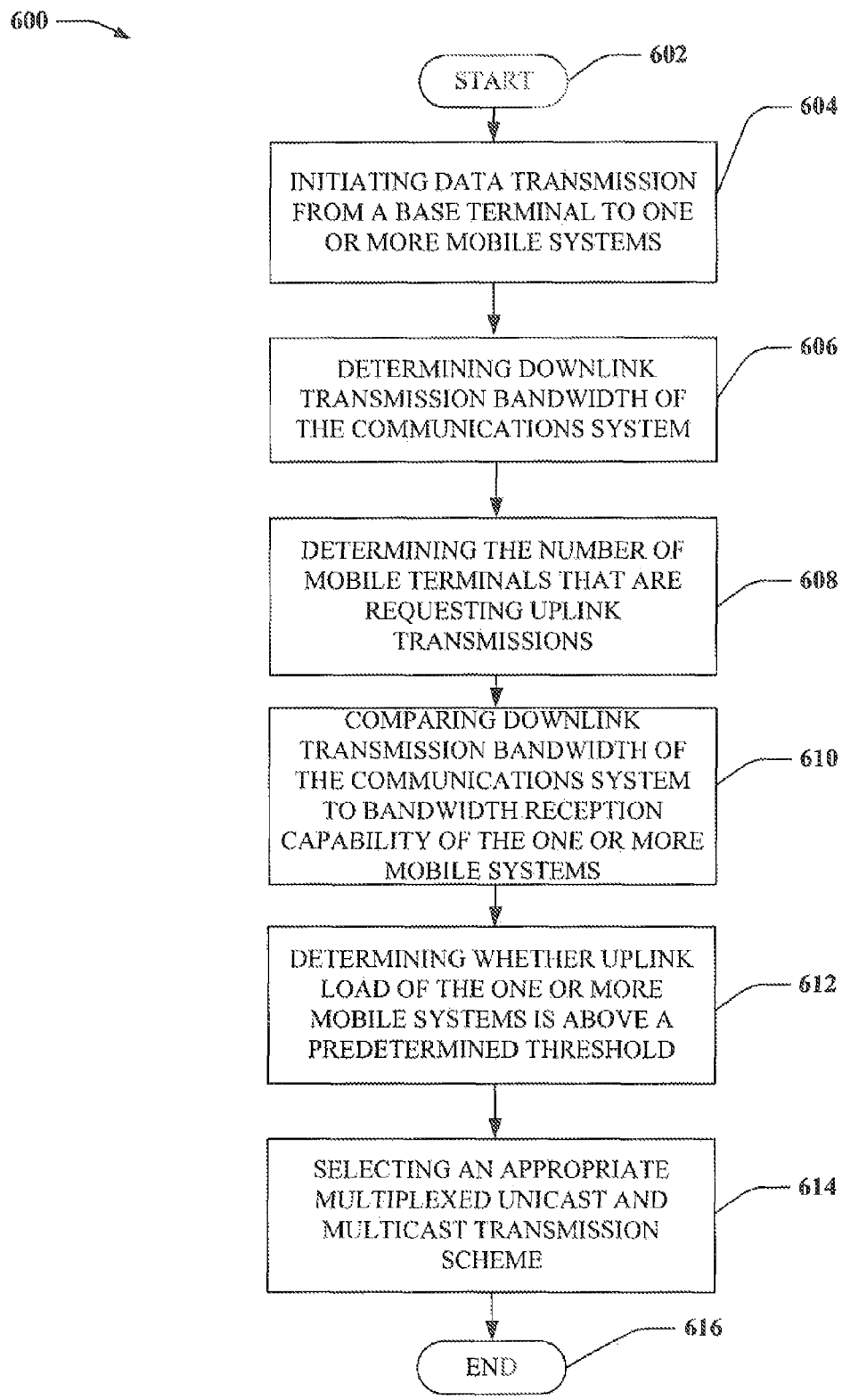
FIG. 6 is an illustration of an example methodology that facilitates multiplexing of unicast and multicast transmissions from a base station.

Referring now to FIG. 6, a methodology 600 that facilitates multiplexing of unicast and multicast transmissions from a base station to one or more mobile systems in a wireless communications system is illustrated. Methodology 600 starts at 602 and at 604, a determination is made at the base station that transmission of data to one or more mobile systems is desired. At 606, the overall downlink transmission bandwidth of the wireless communications system is determined. Subsequently, at 608, the number of mobile terminals that are requesting uplink transmissions is determined in order to evaluate how much of the overall communications system bandwidth is being consumed by uplink requests from one or more mobile systems in a wireless communications system to respective base station(s). At 610, the downlink transmission bandwidth of the communications system is compared to bandwidth reception capabilities of one or more mobile systems that are within the wireless communications system in part to determine an optimal unicast and multicast multiplexed transmission scheme to employ. At 612, a determination is made as to whether the aggregate uplink load value calculated at 608 exceeds a pre-determined threshold. The determination at 612 in addition to the determination at 610 allow for selecting an appropriate multiplexed unicast and multicast transmission scheme at 614.

Figure 7:
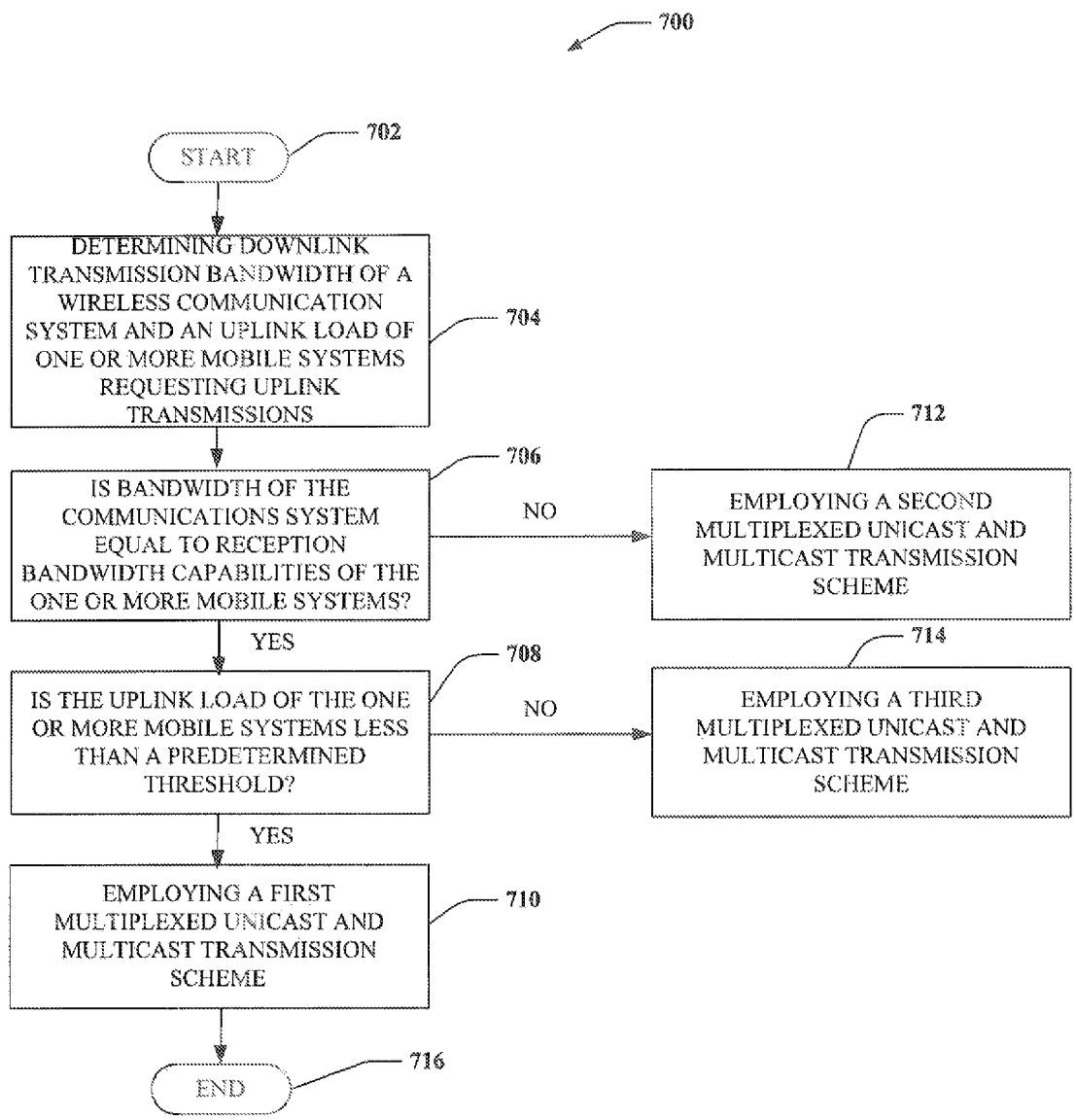
FIG. 7 is another illustration of an example methodology that facilitates multiplexing of unicast and multicast transmissions from a base station.

With reference now to FIG. 7, an example methodology 700 is illustrated that facilitates multiplexing of unicast and multicast transmissions from a base station to one or more mobile systems in a wireless communications system environment. The methodology 700 starts at 702 and at 704, both downlink transmission bandwidth of the wireless communication system and uplink load associated with the uplink transmission requests of one or more mobile systems are determined. At 706, a determination is made as to whether the downlink transmission bandwidth of the wireless communications system is equal to the bandwidth reception capabilities of one or more mobile systems that are within the wireless communications system. If the determination is YES at 706, the methodology proceeds to 708. At 708, the uplink load that was calculated at 704 is compared to a pre-determined threshold. If the uplink load is less than the pre-determined threshold, the methodology proceeds to 710. At 710, a first multiplexed unicast and multicast transmission scheme is employed. In particular, for example, the transmission scheme described in FIG. 5a can be employed at 710, wherein one or more portions 504, 506, or 508 within a dedicated system bandwidth (which amounts to less than half of all available bandwidth) can be allocated for multicast transmission. It is to be appreciated that the system bandwidth allocation is not limited to portions 504, 506, and 508 as illustrated in the example embodiment of FIG. 5a.

If the determination at 708 is NO, a third multiplexed unicast and multicast transmission scheme is employed at 712. For example, the second transmission scheme can be similar to the scheme illustrated in FIG. 5b, wherein downlink transmission bandwidth of the wireless communications system is equivalent to bandwidth reception capabilities of one or more mobile systems and the uplink load exceeds a pre-determined threshold. In this example, a small portion of the available system bandwidth of a frame can be utilized for a pre-determined duration to provide uplink assignments and ACK/NAK transmission via unicast transmission, and the remaining available bandwidth of the frame can be utilized for multicast transmission.

If the determination at 708 is NO, a third multiplexed unicast and multicast transmission scheme is employed at 714. As an example, the third transmission scheme can be similar to the scheme illustrated in FIG. 5c, wherein downlink transmission bandwidth of the system is greater than the bandwidth reception capabilities of one or more mobile systems. Where the uplink load is below a predetermined threshold, a time-division multiple (TDM) access concept is employed wherein one or more symbols of a frame are dedicated for multicast transmission. However, when the uplink load is above a predetermined threshold, a small portion of the system bandwidth is used to provide uplink assignments and ACK/NAK transmissions via unicast transmission. The duration of the portion may be for one or more symbols of a frame. For the remaining symbols of a frame, a frequency portion allocated to all mobile terminals having the smallest bandwidth (for example 5 Mhz) to perform multicast transmissions is used. The mobile terminals having a higher reception bandwidth (for example 10 Mhz) will use a small portion of the available bandwidth as would the mobile terminals having a smaller bandwidth (for example 5 Mhz). However, the mobile terminals having a higher reception bandwidth may use other portions of the available bandwidth to perform unicast transmissions.

Figure 8:
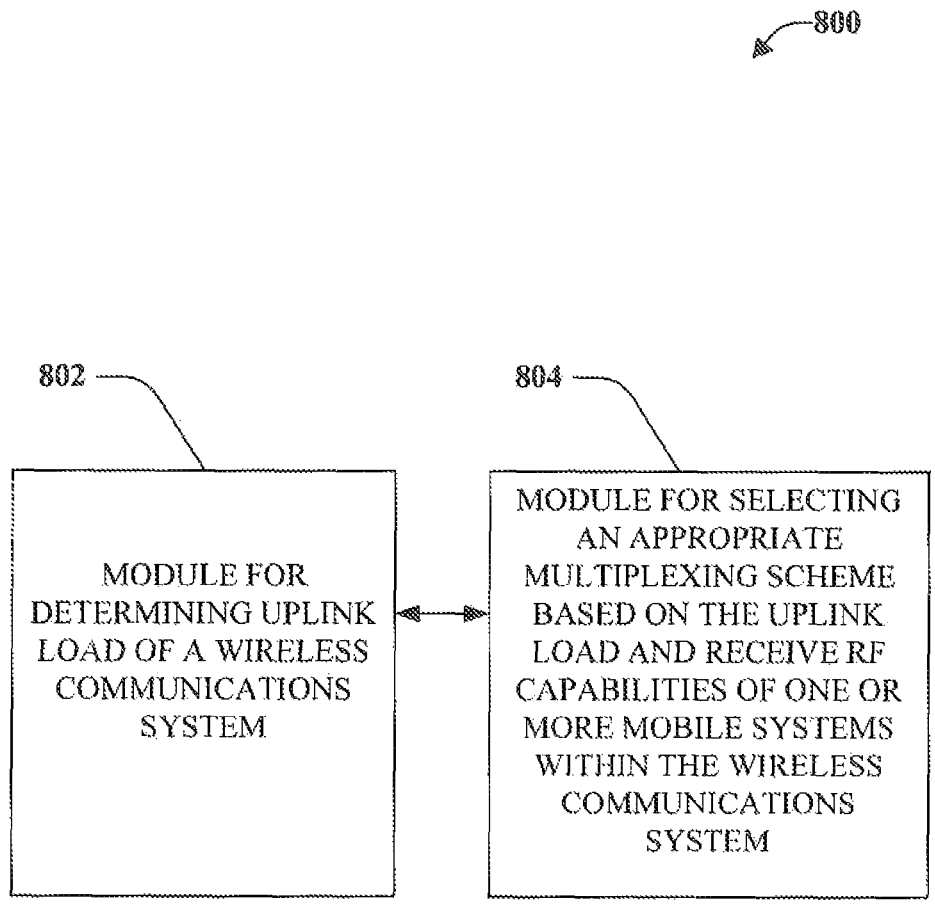
FIG. 8 is a block diagram of a system that facilitates multiplexing unicast and multicast transmissions.

Referring now to FIG. 8, a system 800 that facilitates multiplexing unicast and multicast transmissions is illustrated. System 800 can include a module 802 for determining uplink load from one or more mobile systems to a network within a wireless communications system. It is to be appreciated that the uplink load can be a value that represents a number of mobile systems requesting uplink data transmissions from the mobile systems to the network. System 800 can further include a module 804 for selecting an appropriate unicast and multicast multiplexing scheme. It is to be appreciated that module 804 can employ any multiplexer selection scheme, and in particular the multiplexing schemes described herein.

Figure 9:
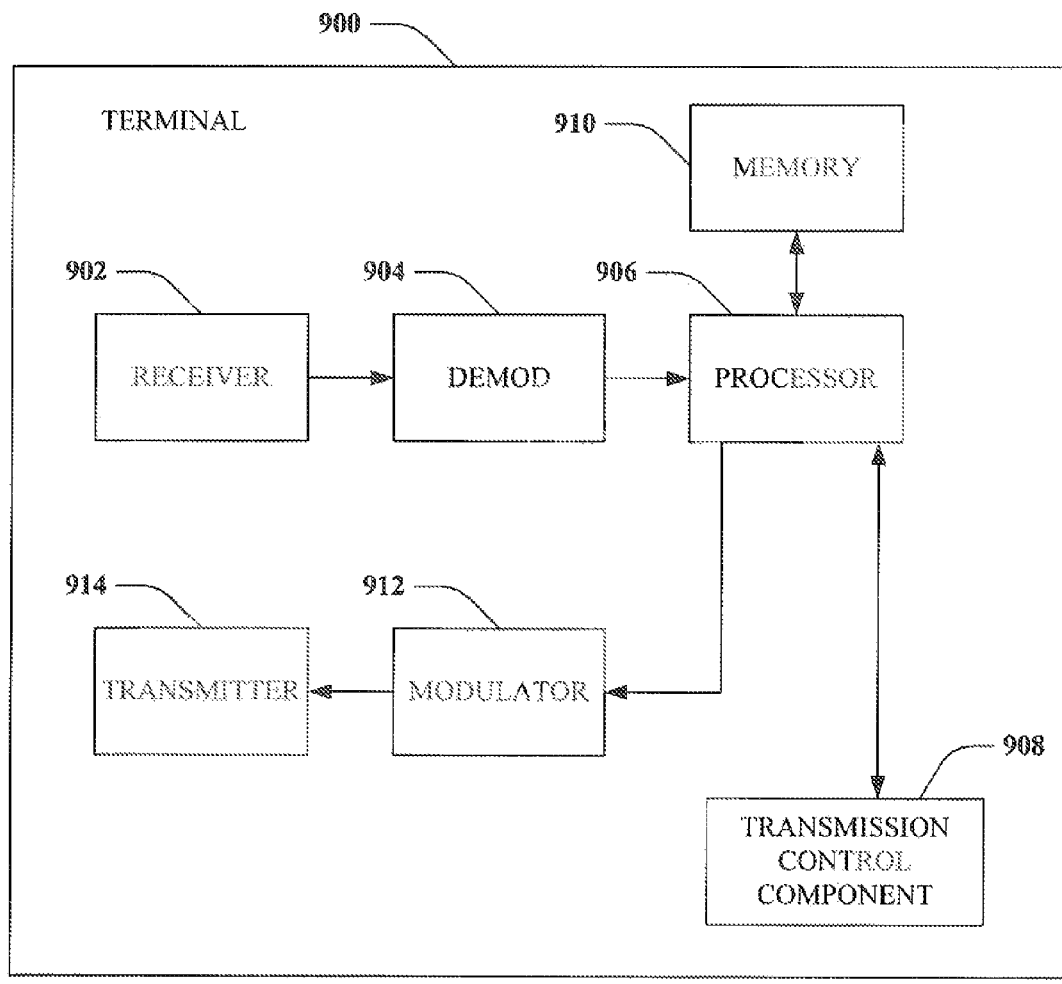
FIG. 9 illustrates a system that provides for other sector communication in accordance with one or more aspects presented herein.

FIG. 9 is an illustration of a terminal or user device 900 that provides for other sector communication in a wireless communication environment in accordance with one or more aspects set for herein. Terminal 900 comprises a receiver 902 that receives a signal, for instance one or more receive antennas, and performs typical actions (e.g., filters, amplifies, downconverts, etc) the received signal and digitizes the conditional signal to obtain samples. A demodulator 904 can demodulate the samples and provide received pilot symbols to a processor 906.

Processor 906 can be a processor dedicated to analyzing information received by receiver component 902 and/or generating information for transmission by a transmitter 914. Processor 906 can be a processor that controls one or more components of terminal 900, and/or a processor that analyzes information received by receiver 902, generates information for transmission by a transmitter 914, and controls one or more components of terminal 900. Processor 906 can utilize any of the methodologies described herein, including those described with respect to FIGS. 6 and 7.

In addition, terminal 900 can include a transmission control component 908 that analyzes received input, including acknowledgements of successful transmissions. Acknowledgements (ACK) can be received from the serving sector and/or a neighboring sector. Acknowledgements can indicate that a previous transmission has been successfully received and decoded by one of the access points. If no acknowledgement is received, or if a negative acknowledgement (NAK) is received, the transmission can be resent. Transmission control component 908 can in incorporated into the processor 906. It is to be appreciated that transmission control component 908 can include transmission control code that performs analysis in connection with determining receipt of acknowledgement.

Terminal 900 can additionally comprise memory 910 that is operatively coupled to processor 906 and that can store information related to transmissions, an active set of sectors, methods for controlling transmissions, lookup tables comprising information related thereto, and any other suitable information related to transmissions and active set sectors as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM(PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Syncklink DRAM (SLDRAM), and direct Rambus RAM (DRRAM). The memory 910 of the subject systems and methods is intended to comprise, without being limited to, these and any other suitable types of memory. Processor 906 is connected to a symbol modulator 912 and transmitter 914 that transmits the modulated signal.

Figure 10:
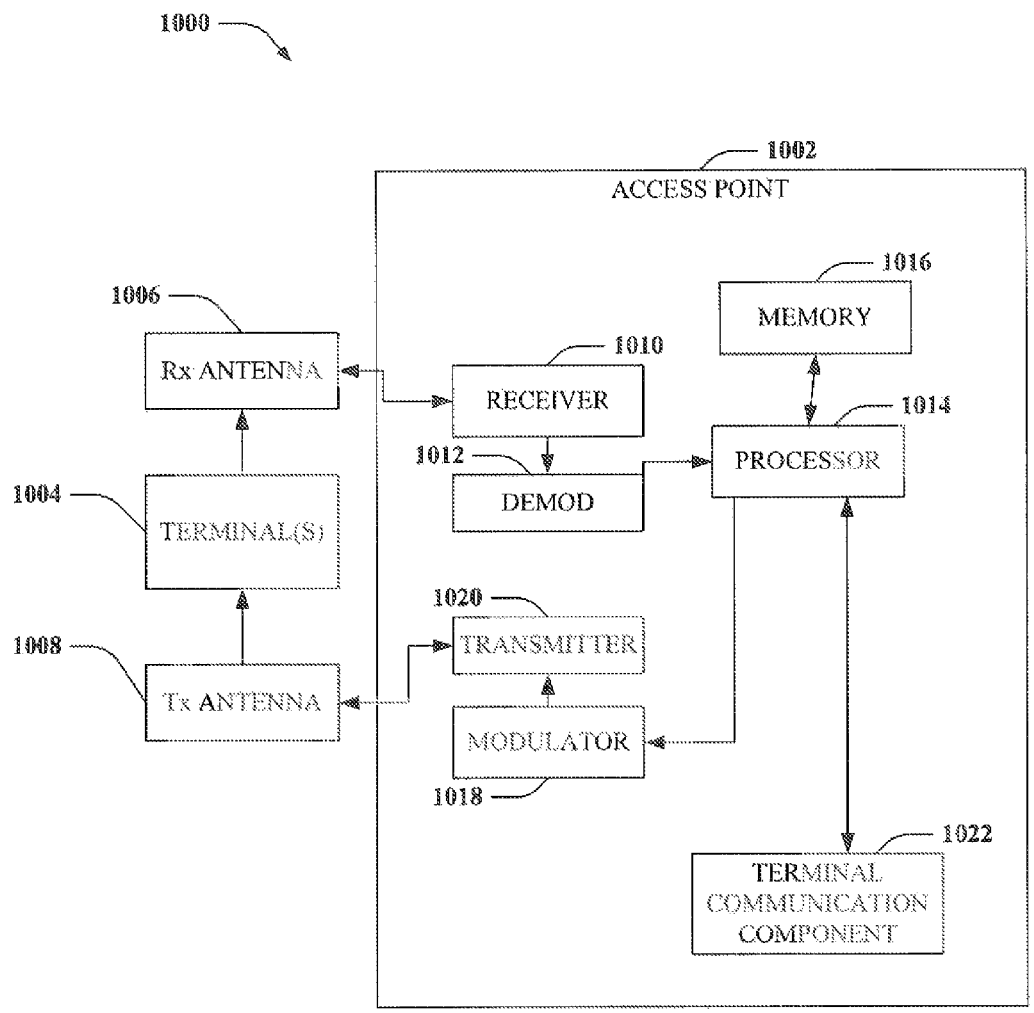
FIG. 10 illustrates a system that provides for processing reverse link communications at a non-serving sector of a terminal in accordance with one or more aspects presented herein.

FIG. 10 is an illustration of a system 1000 that facilitates other sector communication in a communication environment in accordance with various aspects. System 1000 comprises an access point 1002 with a receiver 1010 that receives signal(s) from one or more terminals 1004 through one or more receive antennas 1006, and transmits to the one or more terminals 1004 through a plurality of transmit antennas 1008. Terminals 1004 can include those terminals supported by the access point 1002, as well as terminals 1004 supported by neighboring sectors. In one or more aspects, receive antennas 1006 and transmit antennas 1008 can be implemented using a single set of antennas. Receiver 1010 can receive information from receive antennas 1006 and is operatively associated with a demodulator 1012 that demodulates received information. Receiver 1010 can be for example, an MMSE-based receiver, or some other suitable receiver for separating out terminals assigned thereto, as will be appreciated by one skilled in the art. According to various aspects, multiple receivers can be employed (e.g., one per receive antennas), and such receivers can communicated with each other to provide improved estimates of user data. Demodulated symbols are analyzed by a processor 1014 that is similar to the processor described above with regard to FIG. 9, and is coupled to a memory 1016 that stores information related to terminals, assigned resources associated with terminals and the like. Receiver output for each antenna can be jointly processed by receiver 1010 and/or processor 1014. A modulator 1018 can multiplex the signal for transmission by a transmitter 1020 through transmit antennas 1008 to terminals 1004.

Access point 1002 further comprises a terminal communication component 1002, which can be a processor distinct from, or integral to, processor 1014. Terminal communication component 1022 can obtain resource assignment information for terminals supported by neighboring sectors. In addition, terminal communication component 1022 can provide assignment information to neighboring sectors for terminals supported by access point 1002. Assignment information can be provided via backhaul signaling.

Based upon information regarding assigned resources, terminal communication component 1022 can direct detection of transmissions from terminals supported by neighboring sectors, as well as decoding of received transmissions. Memory 1016 can maintain packets received from terminals prior to receipt of the assignment information necessary for decoding of packets. Terminal communication component 1022 can also control transmission and receipt of acknowledgments indicating successful reception and decoding of transmissions. It is to be appreciated that terminal communication component 1022 can include transmission analysis code that performs utility based control in connection with assigning resources, identifying terminals for soft handoff, decoding transmissions and the like. The terminal analysis code can utilize artificial intelligence based methods in connection with performing interference and/or probabilistic determinators and/or statistical-based determinations in connection with optimizing terminal performance.

What has been described above include examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of performing multicast and unicast transmission in a wireless communication system, the method comprising:
    determining, in a component, an uplink load of the system; and
    selecting, in another component, a multiplexing scheme for multiplexing multicast and unicast transmissions over system resources based on the uplink load and a radio-frequency (RF) reception bandwidth capability of one or more mobile terminals.

2. The method of claim 1, further comprising employing one of a plurality of transmission schemes when available system downlink bandwidth is equal to the reception bandwidth capability of the one or more mobile terminals.

3. The method of claim 2, wherein the uplink load of the system is below a first threshold value.

4. The method of claim 3, further comprising employing a first of the plurality of transmission schemes, the first transmission scheme dedicates one or more portions of available system downlink bandwidth for multicast transmission.

5. The method of claim 2, wherein the uplink load of the system is above a first threshold value.

6. The method of claim 5, further comprising employing a second of the plurality of transmission schemes.

7. The method of claim 6, further comprising dedicating a first portion of a frame for one of uplink assignments and acknowledgement/negative acknowledgement (ACK/NAK) of successful transmission.

8. The method of claim 7, further comprising dedicating remaining bandwidth of a frame for multicast transmission.

9. The method of claim 1, further comprising employing a third transmission scheme upon detecting available system downlink bandwidth is greater than the reception bandwidth capability of the one or more mobile terminals.

10. The method of claim 9, wherein the uplink load of the system is below a threshold value.

11. The method of claim 10, further comprising utilizing a time division multiple (TDM) access concept and dedicating one more symbols of a frame for multicast transmission utilizing a first portion of available system bandwidth, the first portion limited to the reception bandwidth capability of the one or more mobile terminals.

12. The method of claim 9, wherein the uplink load of the system is above a threshold value.

13. The method of claim 12, further comprising utilizing a first portion of available system downlink bandwidth to provide uplink assignments and ACK/NAK transmission.

14. The method of claim 13, further comprising utilizing a frequency portion of remaining system downlink bandwidth for at least one of the one or more mobile terminals that have a smaller reception bandwidth capability to receive multicast transmissions.

15. The method of claim 14, further comprising utilizing the frequency portion of remaining system downlink bandwidth for at least one of the one or more mobile terminals that have a larger bandwidth reception bandwidth capability to receive multicast transmissions.

16. The method of claim 15, further comprising allocating one or more additional portions of available system downlink bandwidth to the at least one of the one or more mobile terminals having a higher bandwidth reception bandwidth capability to perform unicast transmissions.

17. An apparatus, comprising:
    a monitoring component that monitors uplink load in a wireless communications system; and
    a scheduling component that selects an appropriate unicast transmission and multicast transmission multiplexed transmission scheme for multiplexing multicast and unicast transmissions over system resources based at least in part upon the uplink load and a radio-frequency (RF) reception bandwidth capability of one or more mobile terminals.

18. The apparatus of claim 17, the monitoring component further monitors availability of downlink transmission bandwidth of the system and reception bandwidth capability of the one or more mobile terminals.

19. The apparatus of claim 18, further comprising an analysis component that compares the availability of downlink transmission bandwidth of the system and reception bandwidth capability of the one or more mobile terminals.

20. The apparatus of claim 19, the scheduling component selects an appropriate transmission scheme based at least in part upon results determined by the analysis component.

21. A non-transitory computer readable medium having stored thereon computer executable instructions for performing the following acts:
    determining an uplink load of a wireless communications system; and
    selecting a multiplexing scheme for multiplexing multicast and unicast transmissions over system resources based on the uplink load and a radio-frequency (RF) reception bandwidth capability of one or more mobile terminals.

22. The computer readable medium of claim 21, further comprising selecting one of a plurality of multiplexing schemes based at least in part upon comparing downlink transmission bandwidth of the system to the reception bandwidth capability of the one or more mobile terminals.

23. A processor having stored thereon, as part of a non-transitory storage medium, computer executable instructions for performing the following acts:
    determining an uplink load of a wireless communications system;
    determining a radio-frequency (RF) reception bandwidth capability of one or more mobile terminals; and
    selecting a multiplexing scheme for multiplexing multicast and unicast transmissions over system resources based on the uplink load and the RF reception bandwidth capability of the one or more mobile terminals.

24. The processor of claim 23, further comprising selecting one of at least three multiplexing schemes based at least in part upon comparing downlink transmission bandwidth of the system to the reception bandwidth capability of the one or more mobile terminals.

25. An apparatus, comprising:
    means for determining an uplink load of a wireless communications system; and
    means for selecting an appropriate unicast transmission and multicast transmission multiplexing scheme for multiplexing multicast and unicast transmissions over system resources based at least in part on the uplink load and a radio-frequency (RF) reception bandwidth capability of one or more mobile systems within the wireless communications system.

26. The method of claim 1, wherein the selecting comprises selecting a time division multiplexing scheme, a frequency division multiplexing scheme, or a combination thereof, for multiplexing the multicast and unicast transmissions.

* * * * *